United States Patent [19]

Ratigan

[11] 4,250,144
[45] Feb. 10, 1981

[54] CHLORINE DIOXIDE GENERATING SYSTEM

[75] Inventor: Brian J. Ratigan, Philadelphia, Pa.

[73] Assignee: Fischer & Porter Company, Warminster, Pa.

[21] Appl. No.: 48,633

[22] Filed: Jun. 14, 1979

[51] Int. Cl.³ .................. G05B 9/00; F16K 31/12; G05D 7/00; C01B 11/02
[52] U.S. Cl. ................... 422/112; 210/754; 422/113; 422/114; 422/117; 422/129; 423/477
[58] Field of Search ............ 422/129, 112, 113, 114, 422/117; 210/62; 423/477

[56] References Cited

U.S. PATENT DOCUMENTS

| 2,745,714 | 5/1956 | Woodward | 423/477 X |
|---|---|---|---|
| 3,322,497 | 5/1967 | Martin | 422/129 X |
| 3,627,275 | 12/1971 | Gusmer | 422/135 X |
| 3,864,456 | 2/1975 | Winfield et al. | 423/478 |
| 3,975,284 | 8/1976 | Lambert | 210/62 X |
| 4,013,761 | 3/1977 | Ward | 210/62 X |
| 4,041,981 | 8/1977 | Davis et al. | 261/DIG. 75 X |
| 4,143,115 | 3/1979 | Ward | 422/113 |

FOREIGN PATENT DOCUMENTS

| 757426 | 4/1971 | Belgium | 423/477 |
| 855700 | 11/1952 | Fed. Rep. of Germany | 423/477 |
| 1076636 | 9/1958 | Fed. Rep. of Germany | 423/477 |
| 1467024 | 11/1969 | Fed. Rep. of Germany | 423/477 |
| 2343171 | 3/1975 | Fed. Rep. of Germany | 423/477 |

Primary Examiner—Barry Richman
Attorney, Agent, or Firm—Michael Ebert

[57] ABSTRACT

A system for generating chlorine dioxide for use as a disinfectant in water or wastewater treatment, the system output including a percentage of chlorine at an acceptably low level, thereby avoiding the deleterious effect of chlorine in the disinfection process. The system is provided with a source of chlorine gas and a source of aqueous sodium chlorite, both of which are fed into a reactor to generate chloride dioxide therein. The output of the reactor is coupled to an ejector operated by a water stream to create a vacuum which draws chlorine dioxide from the reactor into the ejector to dilute the chlorine dioxide before it is supplied to a process being treated. The resultant negative pressure in the reactor acts to draw the chlorine gas therein from the source through a vacuum regulator which maintains the flow of chlorine gas into the reactor at a constant rate and acts to cut off the supply of chlorine in the absence of negative pressure.

8 Claims, 1 Drawing Figure

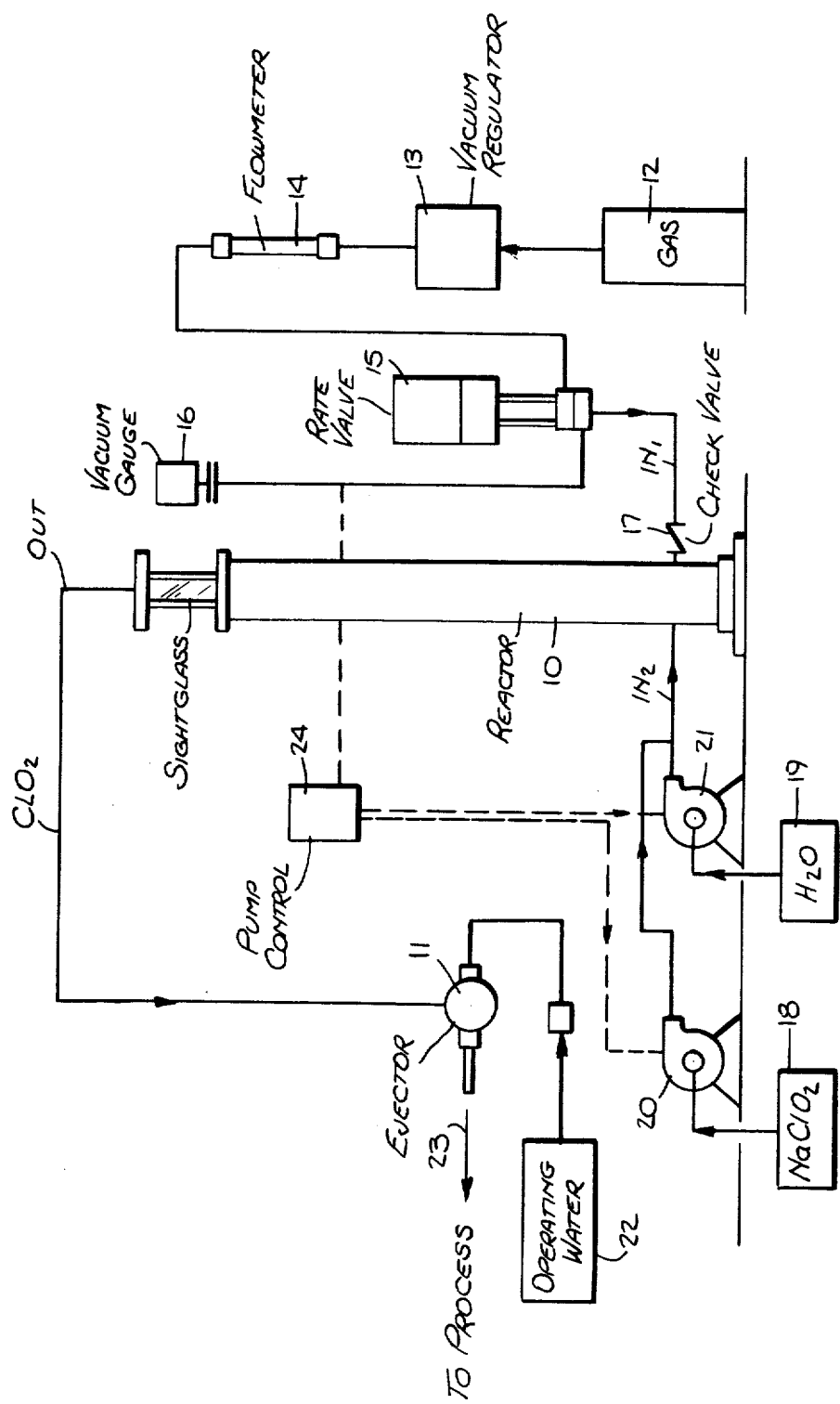

CHLORINE DIOXIDE GENERATING SYSTEM

BACKGROUND OF INVENTION

This invention relates generally to the production of chlorine dioxide in a concentration suitable for use as a disinfectant in wastewater treatment to destroy pathogens, and more particularly to an improved chlorine dioxide generating system which operates efficiently and economically to yield a chlorine dioxide output having a low percentage of chlorine.

Chlorination is widely used to purify water supplies. In practice, chlorine is introduced at a selected point in the water supply system, flow then taking place into a tank or through a region of flow which is sufficient for the chlorine to act effectively on the contaminants present in the water to produce a disinfecting action. The amount of chlorine added to the water is referred to as the "dosage," and is usually expressed as milligrams per liter (mg/l) or parts per million (ppm). The amount of chlorine used up or consumed by bacteria, algae, organic, compounds and some inorganic substances, such as iron or manganese, is designated as the "demand."

When chlorine dissolves in water, a mixture of hypochlorous and hydrochloric acids is formed. The hydrochloric acid always completely dissociates into hydrogen and chloride ions, whereas the hypochlorous acid only partially dissociates into hydrogen and hypochlorite ions as a function of the pH of the water. In either the hypochlorous or hypochlorite form, chlorine is called "free chlorine residual." Hypochlorous acid has a highly effective killing power toward bacteria, whereas the hypochloride ion is a much less effective disinfectant.

Should the chlorinated water contain ammonia or certain amino (nitrogen-based) compounds, called chloramines, are created. Chloramines may occur almost instantaneously, depending mainly on water pH.

Many applications exist for chlorine in wastewater treatment facilities, such as for odor control of raw sewage and the control of hydrogen sulfide in sewers, but its most universal application lies in wastewater treatment facilities for the terminal disinfection of the treated plant effluent just before the effluent is discharged. The term wastewater as used herein is intended to include all waters in need of treatment such as water derived from industrial and municipal discharges, as well as naturally occurring waters and agricultural runoffs.

The virtues of chlorination have long been appreciated, but it is only recently that the hazards involved in excessive chlorination have been publicly recognized. In studies carried out in the chlorinated water supply of the City of New Orleans, it was found that the levels of chlorination were such as to release carcinogenic agents dangerous to the community. The results of this study are reported in the article by R. A. Harris, "The Implication of Cancer Causing Substances in Mississippi River Water," published by the Environmental Defense Fund, Washington, D.C., Nov. 6, 1974.

Shortly after this study appeared, Public Law 93-523 went into effect authorizing the EPA administrator to conduct a comprehensive study of public water supplies "to determine the nature, extent, source of, and means of control of contamination by chemicals or other substances suspected of being carcinogens."

Subsequently, Jolly ("Chlorine-containing Organic Constituents in Chlorinated Effluents"—Journal of the Water Pollution Control Fed., 47:601–618 (1975) reported the presence of forty-four chloro-organic compounds in a chlorinated secondary wastewater effluent.

The formation of compounds suspected of being carcinogenic as a result of the reaction of chlorine with hydrocarbons in wastewater is by no means the only unwanted side effect caused by the traditional disinfection process, for chlorine residuals in wastewater give rise to an environment that is toxic to aquatic organisms. Though chlorine is a highly effective biocide for undesirable organisms, it is also deadly to fish and other forms of aquatic life and therefore has a deleterious impact on fresh water, marine and estuary eco-systems.

It is now recognized that chlorine dioxide ($ClO_2$) can provide significantly better results in many wastewater treatment systems where the use of chlorine has been proven to be hazardous or relatively ineffective. Chlorine dioxide possesses valuable bactericidal and viricidal properties and has an oxidizing capacity over twice that of chlorine. The disinfecting ability of chlorine depends on the hypochlorous acid it forms when dissolved in water, the higher the pH the lower the proportion of hypochlorous acid present. Hence chlorine disinfection decreases markedly as the pH rises. But the effectiveness of chlorine dioxide is about the same over the entire pH range, which renders it a far more effective disinfectant at higher pH values.

But from the standpoint of public safety, the most important characteristic of $ClO_2$ is that it does not react with ammonia and most ammonium nitrogen compounds, and though it degrades phenols, it does so without producing offensive chlorophenols. Thus while in contaminated waters, large quantities of chlorine can be consumed before creating the residual needed for disinfection, the use of $ClO_2$ in the same situation usually entails much smaller quantities to reach the desired residual, for $ClO_2$ is very selective in its reactions with organics and is non-reactive with ammonia.

Another important practical application for chlorine dioxide is as a disinfectant for cooling water systems in power plants. Chlorine dioxide is more effective in inhibiting algae growth in such systems than chlorine. Since the growth of algae impairs the heat transfer characteristics of the system, the use of a disinfectant is essential.

One known method for generating chlorine dioxide is to react sodium chlorite and chlorinated water in the manner disclosed for example in U.S. Pat. No. 4,013,761 by Ward et al. assigned to Olin Corporation, this process being known commercially as the Dioxolin Process System. As indicated in a report (undated) published by Olin Corporation entitled "Treatment of Water Supplies with Chlorine Dioxide" excess chlorine must be added to improve the reaction yield. An excess of chlorine will bring about a full conversion of sodium chlorite to chlorine dioxide, but only under strict pH and chlorine concentration limitations. As a consequence, the output of the system is constituted by a high percentage of chlorine as well as chlorine dioxide. Thus with this chlorine dioxide generating system one does not obviate the known hazards incident to the use of chlorine in wastewater.

The use of excess chlorine can be avoided, as indicated in the Ward et al patent, by reacting aqueous sodium chlorite, sodium hypochlorite and a mineral acid to generate chlorine dioxide, the mineral acid containing sulfuric acid or hydrochloric acid. And while the yield of this system is high and is also chlorine free, the system is relatively expensive to operate because of the high cost of mineral acids and sodium hypochlorite.

Another known approach to generating chlorine dioxide involves an enrichment loop as disclosed in the U.S. Pat. No. 3,975,284 to Lambert in which a concentrated aqueous chlorine solution is reacted stoichiometrically with a sodium chlorite solution. In this arrangement, known commercially as the CIFEC system, use is made of a recirculation loop of aqueous chlorine solution under a plug-flow regime which prevents negative hydraulic gradient conditions that are detrimental to the process. Recirculation is accomplished by a special positive displacement pump which also produces the hydraulic power to operate a chlorinator injector. A rotameter assembly and diaphragm valve regulates the feed of make-up water into the loop. A sodium chlorite metering pump injects a specified concentration of this solution into a chlorine dioxide reactor where the reaction between HOCl and $NaClO_2$ produces $ClO_2$.

While the enrichment loop system for generating chlorine dioxide yields a chlorine dioxide output which has a low percentage of chlorine, the system is relatively complex and, by reason of the recirculating pump, is high in its energy consumption.

SUMMARY OF INVENTION

In view of the foregoing, the main object of this invention is to provide a chlorine dioxide generating system which operates efficiently, safely and economically to yield a chlorine dioxide output having a low percentage of chlorine whereby the resultant chlorine dioxide stream which is applied to a process may be used as a disinfectant without deleterious side effects.

More particularly, it is an object of this invention to provide a system for generating chlorine dioxide by stoichiometric reaction of chlorine gas and an aqueous solution of sodium chlorite on a scale suitable for water and waste treatment plants or for other practical applications requiring an effective disinfectant.

Briefly stated, in a system in accordance with the invention, fed into respective inlets of a reactor are chlorine gas and an aqueous solution of sodium chlorite to generate chlorine dioxide therein. The outlet of the reactor is coupled to an ejector operated by a water stream which creates a vacuum drawing chlorine dioxide from the reactor into the ejector and serving to safely dilute the chlorine dioxide before it is supplied to a process to be treated. The resultant negative pressure in the reactor acts to draw the chlorine gas therein through a vacuum regulator which acts to maintain the flow of chlorine gas into the reactor at a constant rate and to cut off the supply of chlorine in the absence of negative pressure.

OUTLINE OF THE DRAWING

For a better understanding of the invention as well as other objects and further features thereof, reference is made to the following detailed description of the invention to be read in conjunction with the annexed drawing whose single FIGURE is a schematic illustration of a preferred embodiment of a chlorine dioxide generating system in accordance with the invention.

DESCRIPTION OF INVENTION

In producing chlorine dioxide, it is the common practice for this purpose to react aqueous sodium chlorite with chlorinated water. And to insure fast and high conversions of $NaClO_2$ into $ClO_2$, an excess of chlorine is usually employed. For reasons of safety, chlorine is preferably used under vacuum, typically by means of a water-operated ejector through which water is projected at high velocity into an interaction zone. This Venturi action creates a vacuum acting to draw chlorine gas into the interaction zone to intermingle with the water, thereby producing a chlorinated water which is discharged from the throat of the ejector. The resultant $Cl_2$ solution is then reacted with an $NaClO_2$ solution in a reactor vessel to produce the desired chloride dioxide output.

Due to inherent hydraulic limitations, chlorinated water ejectors are not effective in producing highly concentrated solutions. The maximum obtainable concentration is about 5000 mg/L, the concentration decreasing with the size of the ejector.

The $ClO_2$ reaction rate and the yield are highly dependent on the reactant concentration and the reaction time, respectively. In many situations, for the reasons given in the background section, the presence of chlorine in the chlorine dioxide output of the reactor is no longer acceptable. Yet without excess chlorine, the reaction takes much longer to approach equilibrium. For example, starting with an initial $Cl_2$ concentration of 500 mg/L and an initial $NaClO_2$ concentration of 1274 mg/L, it takes 10 minutes to achieve a 95% conversion to $ClO_2$. The resultant concentrations would be 25 mg/L $Cl_2$, 63.7 mg/L $NaClO_2$ and 903 mg/L $ClO_2$.

Lower initial concentrations are rendered impractical because of the large size of the reactor then required. And because of ejector limitations, it is impossible to obtain a large operating range using a single generator, especially for lower capacity designs.

In the above-identified CIFEC chlorine dioxide generator which makes use of an enrichment loop, chlorine gas is admitted into the loop through an ejector to concentrate the chlorinated water before injection along with sodium chlorite into a packed column reactor. In the CIFEC generator, $Cl_2$ concentration could be as high as 5,000 mg/L and maintained essentially constant; while $ClO_2$ concentration could be as high as 9500 mg/L, thereby overcoming many of the drawbacks of conventional ejector practice. But, as noted previously, the CIFEC technique requires a positive displacement recirculating pump and the water makeup must be adjusted to compensate for flow rate changes. The $Cl_2$ solution feed rate to the reactor is controlled by the makeup water rate and the $Cl_2$ gas rate while the flow rate of $NaClO_2$ into the reactor is independently controlled via a positive-displacement or metering pump.

In a chlorine dioxide generator system in accordance with the invention, the drawbacks normally experienced with an ejector are overcome, this being accomplished by interposing a reactor 10, as shown in the single FIGURE, between an ejector 11 and the reactant supplies. Reactor 10 is preferably constituted by a vertical column fabricated of polyvinyl chloride, the column being filled with packing such as rings or saddles, or static mixers.

Reactor 10 functions to mix gas/liquid phases and to afford the necessary retention time. The reactor is designed for minimum pressure drop. In practice, the reactor design may be similar to reactors included in the above-noted Dioxolin and CIFEC chlorine dioxide generators.

Supplied under vacuum through an inlet $IN_1$ into the bottom of the reactor column is chlorine gas derived from a cylinder or other suitable source 12, the gas being fed into the column serially through a standard vacuum regulator 13, a flowmeter 14 and a rate valve 15. A vacuum gauge 16 is connected between rate valve 15 and the reactor inlet. Though it would be possible to supply $Cl_2$ under pressure, this is not regarded as a safe practice in the water and waste industry. A back flow valve 17 is provided in inlet $IN_1$ to prevent the reactor contents from flowing into the chlorine gas line when the reactor is not in operation.

Also supplied into the bottom of the reactor column through a separate inlet $IN_2$ is a diluted aqueous solution of sodium chlorite, this being derived from a $NaClO_2$ source 18 and from a water source 19. The sodium chlorite is supplied to inlet $IN_2$ through a positive displacement pump 20 while the water is fed thereto through a positive displacement pump 21.

Operating water from a source 22 is fed under pressure into ejector 11, which in practice may be of the type disclosed in the Davis et al. U.S. Pat. No. 4,041,981. The water is projected at high velocity into an interaction zone to create a vacuum acting to draw into this zone a concentrated solution of chlorine dioxide from the output line OUT at the upper end of the reactor 10.

In the ejector interaction zone, the water and concentrated chlorine dioxide solution, which are both in a highly turbulent state, are vigorously intermingled to yield a diluted solution of chlorine dioxide which is discharged from the throat of the ejector in an output line 23 which leads to the process being treated. Thus when the ejector is operating, a negative pressure is created in reactor 10 coupled thereto.

Because in a system in accordance with the invention chlorine gas is being added directly to the sodium chlorite solution in reactor 10, it becomes possible to generate therein a highly concentrated reaction mixture. Vacuum regulator 13 for the chlorine gas supply is of the type conventionally used in commercial chlorinators such as Fischer & Porter Model 1700 Chlorinators and is adapted to operate under a range of negative pressure values to supply chlorine at a constant flow rate to the reactor, the rate being determined by the setting of the rate valve 15.

The operation of the Model 1700 Chlorinator uses the principle of sonic flow. For a given set of upstream conditions, the rate of discharge of a gas from a nozzle will increase for a decrease in the absolute pressure ratio $P_2/P_1$ ($P_1$ is the flow input pressure and $P_2$ the throat pressure) until the linear velocity in the throat reaches that of sound in the gas at that location. The value of $P_2/P_1$ at which the acoustic velocity is just attained is called the critical ratio $r_c$ and is roughly about $\frac{1}{2}$. The actual pressure in the throat will not fall below $r_c P_1$ even if a much lower pressure exists downstream.

In practical terms, rate valve 15 behaves as a nozzle, and vacuum regulator 13 maintains a constant 20" $H_2O$ vacuum ($P_1$). Ejector 11 maintains a vacuum downstream of the rate valve such that the pressure $P_2$ right at the rate valve is low enough for sonic conditions. In practice, therefore, as long as the downstream vacuum is 12" Hg or greater, steady flow of chlorine will be obtained.

In the event, however, of a leak in the system, the influx of air will put the reactor at atmospheric pressure and thereby cause the vacuum regulator 13 to automatically cut off the supply of chlorine gas to the reactor. Pumps 20 and 21 which feed sodium chlorite and water into reactor 10 are simultaneously cut off by means of an electronic control circuit 24 which is coupled to vacuum gauge 16, the gauge or some other point in the vacuum line being provided with a pressure-responsive transducer to provide a signal to the input of the electronic control circuit when the negative pressure falls below a predetermined level. Thus chlorine gas is only fed into the reactor when the system is operating properly, this being an important safety feature.

The flow rate of sodium chlorite into reactor 10 is determined by pump 20 and is essentially independent of the negative pressure therein, while the flow rate of water into the reactor which is determined by pump 21, is similarly independent of the negative pressure. These flow rates are adjustable by varying the stroke of the pumps or the speed of the pump motors.

Alternatively, control valves may be used for varying the sodium chlorite and water flows using available pressure differential instead of metering pumps. In this case, differential pressure regulators may be used across the control valves to maintain steady flow rates regardless of vacuum fluctuations. The control of water into the reactor is not as critical as the control of chlorine gas and sodium chlorite, for water control serves only to adjust the reactant concentration within the optimum range.

The generator system can be operated automatically by using in place of manually-operated rate valve 15 a control valve such as the "Chloromatic" valve manufactured by Fischer & Porter which responds to dosage and flow inputs. The same signals controlling the chlorine control valve may be used to control the $NaClO_2$ and water pump rate, this resulting in an automatic, continuous $ClO_2$ generating system.

Since the ratio of $Cl_2$ to $NaClO_2$ solution is constant, the reactor concentration is also constant. Changing the rate of generation merely changes the residence time in the reactor. The volume of the reactor is sized for adequate residence time at the maximum generation rate.

In practice, the $ClO_2$ generated in reactor 10 should be between 5000 and 25,000 mg/L; for at lower concentrations, the reaction is slow, and at higher concentrations, the potential for liquid $ClO_2$ (a dangerous chemical) is possible. Also at higher concentrations, more $Cl_2$ is in the gaseous phase, increasing the possibility of short circuiting in the reactor and the resulting decrease in yield. To make available a wide operating range (20:1), means are provided to proportionately vary the respective rates of water from source 19, sodium chlorite from source 20 and chlorine gas from source 12.

Ejector 11 is designed to pull a two-phase stream to maintain a negative pressure in reactor 10. Preferably, the ejector design is such as to create a 12-inch mercury vacuum at the reactor inlet to promote a sonic flow condition across vacuum regulator 13. In practice, source 18 may be a commercially-available 25% sodium chlorite diluted with water from source 19, the sodium chlorite and water supply pumps 20 and 21 being operated by a single drive so that a constant ratio of sodium chlorite and water is maintained thereby.

With a system in accordance with the invention, no recycling pump is needed as in the CIFEC system. Control of water flow rate is much less critical than in the CIFEC arrangement, for the chlorine gas is fed directly into the reactor. The use of the ejector to operate the system affords a constant flow water stream for safely diluting the chlorine dioxide generated in the reactor and for carrying it to its point of application.

While there has been shown and described preferred embodiments of a chlorine dioxide generating system in accordance with the invention, it will be appreciated that many changes and modifications may be made therein without, however, departing from the essential spirit thereof.

I claim:

1. A chlorine dioxide generating system for treating a process with chlorine dioxide that is substantially free of chlorine comprising:
   A. a reactor having two inlets and an outlet, the reactor being constituted by a vertically-positioned packed column, said inlets being at the bottom and said outlet being at the top of the column;
   B. a supply of aqueous sodium chlorite coupled to one inlet of the reactor;
   C. an unpressurized supply of chlorine gas coupled to the other inlet of the reactor whereby gas is drawn into the reactor only when a negative pressure exists therein, the chlorine reacting with the sodium chlorite to generate chlorine dioxide;
   D. an ejector coupled to the outlet of said reactor and operated by a stream of water to produce a vacuum drawing chlorine dioxide from the reactor into the ejector to intermingle with the water stream, whereby the ejector discharges a dilute solution of chlorine dioxide for feeding to the process to be treated, the resultant negative pressure in the reactor drawing chlorine gas therein; and
   E. a vacuum regulator interposed between the other inlet to the reactor and the chlorine gas supply to effectively disconnect said supply from said reactor in the absence of a negative pressure therein, said regulator supplying chlorine gas at a predetermined constant flow rate to the reactor within a range of negative pressure values, said predetermined constant flow rate being independent of the negative pressure value.

2. A system as set forth in claim 1, further including vacuum means to pull said sodium chlorite through a control valve, with a differential pressure regulator to minimize the effects of vacuum variations and provide a steady flow of sodium chlorite.

3. A system as set forth in claim 1, further including means to effect automatic operation in response to changes in chlorine dioxide demand over a 20:1 range of operation.

4. A chlorine dioxide generator system as set forth in claim 1, further including a rate valve interposed between said vacuum regulator and said other inlet, said valve being settable to determine the constant flow rate of said chlorine gas.

5. A chlorine dioxide generator system as set forth in claim 4, further including a backflow valve at said other inlet to prevent the contents of the reactor from flowing out through said other inlet when the reactor is not in operation.

6. A system as set forth in claim 1, wherein said aqueous sodium chlorite is derived from a source of sodium chlorite and a separate source of water, these sources being both coupled to said one inlet of said reactor through respective positive-displacement pumps.

7. A system as set forth in claim 6, further including means to control the drive of the pumps to cut off the pumps in the absence of negative pressure.

8. A system as set forth in claim 7 wherein said means includes an electronic control for the drive which is responsive to the negative pressure.

* * * * *